United States Patent
Tsirkin et al.

(10) Patent No.: US 10,061,616 B2
(45) Date of Patent: Aug. 28, 2018

(54) HOST MEMORY LOCKING IN VIRTUALIZED SYSTEMS WITH MEMORY OVERCOMMIT

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 273 days.

(21) Appl. No.: 13/484,148

(22) Filed: May 30, 2012

(65) Prior Publication Data

US 2013/0326179 A1 Dec. 5, 2013

(51) Int. Cl.
*G06F 9/50* (2006.01)
*G06F 12/126* (2016.01)

(52) U.S. Cl.
CPC .......... *G06F 9/5016* (2013.01); *G06F 12/126* (2013.01); *G06F 2209/5014* (2013.01)

(58) Field of Classification Search
CPC .............................. G06F 9/5016; G06F 12/126
See application file for complete search history.

(56) References Cited

U.S. PATENT DOCUMENTS

| | | | | |
|---|---|---|---|---|
| 6,128,713 A * | 10/2000 | Eisler et al. | | 711/159 |
| 6,226,725 B1 * | 5/2001 | Yarborough | | 711/170 |
| 6,347,364 B1 * | 2/2002 | Liedtke | | 711/163 |
| 6,633,916 B2 * | 10/2003 | Kauffman | | 709/229 |
| 7,024,512 B1 * | 4/2006 | Franaszek | | G06F 12/023 704/500 |
| 7,421,533 B2 * | 9/2008 | Zimmer et al. | | 711/6 |
| 7,624,240 B1 * | 11/2009 | Colbert et al. | | 711/159 |
| 7,665,088 B1 * | 2/2010 | Bugnion et al. | | 718/1 |
| 2004/0143664 A1 * | 7/2004 | Usa et al. | | 709/226 |
| 2008/0127182 A1 * | 5/2008 | Newport et al. | | 718/1 |
| 2009/0025006 A1 * | 1/2009 | Waldspurger | | G06F 9/5016 718/104 |
| 2009/0125700 A1 * | 5/2009 | Kisel | | 711/173 |
| 2009/0233705 A1 * | 9/2009 | LeMay et al. | | 463/25 |
| 2009/0307440 A1 * | 12/2009 | Jacobs et al. | | 711/153 |
| 2009/0307716 A1 * | 12/2009 | Nevarez et al. | | 719/326 |
| 2010/0077128 A1 * | 3/2010 | Stansell et al. | | 711/6 |

(Continued)

OTHER PUBLICATIONS

Waldspurger, Carl A. "Memory Resource Management in VMware ESX Server". Proceedings of the 5th Symposium on Operating Systems Design and Implementation. Held Dec. 9-11, 2002.*

(Continued)

*Primary Examiner* — Charles Rones
*Assistant Examiner* — Hewy H Li
(74) *Attorney, Agent, or Firm* — Lowenstein Sandler LLP (57) ABSTRACT

A system and method for handling requests by virtual machines (VMs) to lock portions of main memory are disclosed. In accordance with one embodiment, a host operating system (OS) of a computer system receives a request by the guest OS of a VM to lock a portion of main memory of the computer system. The host OS determines whether locking the portion of main memory violates any of a set of constraints pertaining to main memory. The host OS locks the portion of main memory when locking does not violate any of the set of constraints. The locking prevents any page of the portion of main memory from being swapped out to a storage device. The host OS can still swap out pages of main memory that are not allocated to this VM and are not locked by any other VM.

12 Claims, 4 Drawing Sheets

(56) References Cited

U.S. PATENT DOCUMENTS

2010/0325381 A1* 12/2010 Heim .......................... 711/170
2011/0138147 A1* 6/2011 Knowles ............... G06F 9/5016
   711/170
2012/0072910 A1* 3/2012 Martin ................ G06F 9/45533
   718/1

OTHER PUBLICATIONS

Denneman, Frank. "Impact of Memory Reservation". <http://frankdenneman.nl/2009/12/08/impact-of-memory-reservation/>. Posted Dec. 8, 2009.*
Kerrisk, Michael. "Memory Locking". Linux Programming Interface: A Linux and UNIX Programming Handbook. p. 1047. Published Aug. 2009.*
Scarfone, Karen. "Guide to Security for Full Virtualization Technologies." NIST. Pub Jan. 2011.*
DiPetrillo, Michael. "Memory Overcommitment in the Real World." <http://blogs.vmware.com/virtualreality/2008/03/memory-overcomm-2.html>. Posted Mar. 18, 2008.*
"Disproportionate Paging." The Cobb Group. Published Dec. 1996. <http://technet.microsoft.com/en-us/library/cc751409.aspx>.*

* cited by examiner

HOST MEMORY LOCKING IN VIRTUALIZED SYSTEMS WITH MEMORY OVERCOMMIT

TECHNICAL FIELD

This disclosure relates to computer systems, and more particularly, to memory locking in virtualized computer systems.

BACKGROUND

A computer system typically includes multiple devices that can store data, operating at different speeds, and it can be advantageous to store the most commonly used data in a fast location, referred to as "memory" or "main memory," and other data in a slower location referred to as "storage." An operating system (OS) is often able to move data between faster memory and slower storage, in a manner transparent to applications. Moving data from memory to storage is often referred to as "swapping out," and moving data from storage to memory is referred to as "swapping in." In some instances it may be desirable or necessary to prevent swapping out of portions of memory (e.g., to meet performance requirements, for security considerations, etc.).

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

Some virtualization platforms provide a feature known as "memory overcommit," where the hypervisor may allocate memory to virtual machines that exceeds the amount of physical memory on the host machine. For example, a hypervisor executing on a server with 2 gigabytes of physical memory might allocate 1 gigabyte each to four virtual machines hosted by the server. In virtualized systems with memory overcommit, pages of memory may be swapped to and from storage (e.g., a storage device such as a magnetic hard disk, a Universal Serial Bus [USB] solid state drive, a Redundant Array of Independent Disks [RAID] system, a network attached storage [NAS] array, etc.) as necessary, in a manner similar to virtual memory in conventional non-virtualized computer systems.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for handling a request by the guest operating system (OS) of a virtual machine (VM) to lock a portion of main memory allocated to the VM. Such a request may be intended to prevent pages of the portion of main memory from being swapped out to storage (e.g., a storage device such as a magnetic hard disk, a Universal Serial Bus [USB] solid state drive, a Redundant Array of Independent Disks [RAID] system, a network attached storage [NAS] array, etc.). Such a request may be submitted, for example, when the guest OS stores, or intends to store, a secure datum (e.g., a password, a private encryption key, etc.) in main memory, so that the secure datum is not swapped out to a storage device and potentially accessed by another virtual machine.

In accordance with embodiments of the present disclosure, a request to lock a portion of main memory that is allocated to a VM is granted when the request does not violate any of a set of memory constraints. These constraints may include one or more of the following:
  the amount of locked main memory per virtual machine should not exceed a given maximum value;
  the total amount of main memory locked by all virtual machines on the computer system should not exceed a given maximum value; and
  the total amount of unlocked main memory should not be less than a given minimum value.

In some embodiments, the memory constraints, as well as the maximum and minimum values for these constraints, may be defined by a system administrator (e.g., via editing of a configuration text file, via a graphical user interface, etc.), while in some other embodiments the constraints and maximum/minimum values may be hardcoded.

Embodiments of the present disclosure are thus capable of intelligently handling requests to lock main memory allocated to virtual machines. Embodiments of the present disclosure are well-suited to virtualized systems that host virtual machines serving different organizations (e.g., data centers hosted by public "cloud" service providers, etc.), as secure data is prevented from escaping each individual organization's virtual machine, while still allowing flexible memory allocation features such as memory overcommit that can maximize system utilization.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "persisting", "stopping", "re-starting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
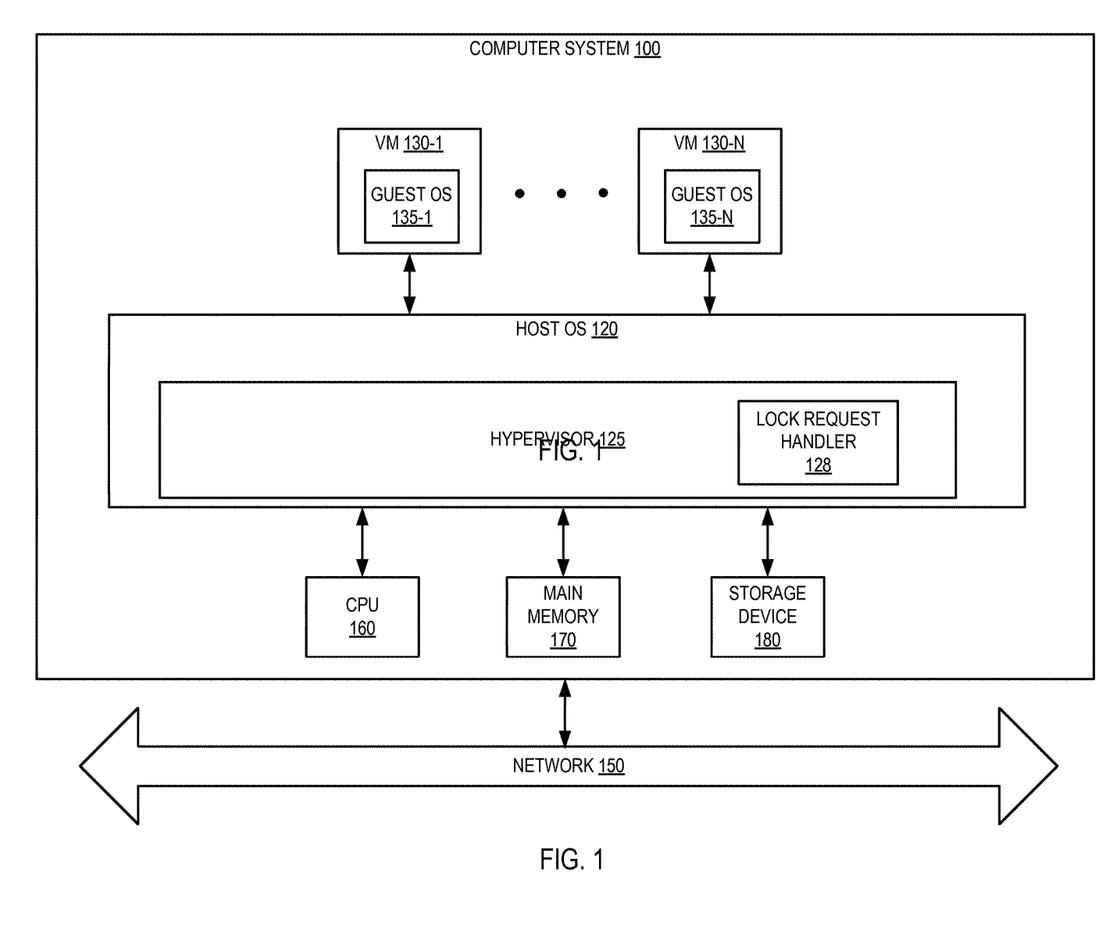
FIG. 1 depicts an exemplary computer system architecture, in accordance with an embodiment of the present invention.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises a central processing unit (CPU) 160, main memory 170, which may include volatile memory devices (e.g., random access memory (RAM)), non-volatile memory devices (e.g., flash memory), and/or other types of memory devices, and a storage device 180 (e.g., a magnetic hard disk, a Universal Serial Bus [USB] solid state drive, a Redundant Array of Independent Disks [RAID] system, a network attached storage [NAS] array, etc.). It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-N and that manages the execution of these virtual machines. In one embodiment, hypervisor 125 provides a memory overcommit capability that enables virtual machines (VMs) 130-1 through 130-N to be allocated more memory than is physically available in main memory 170.

Each virtual machine (VM) 130 is a software implementation of a machine that executes programs as though it were an actual physical machine. As shown in FIG. 1, each virtual machine 130 has its own guest operating system (OS) 135.

In one embodiment, hypervisor 125 includes a lock handler 128 that is capable of determining whether or not to grant memory locking requests by VMs 130-1 through 130-N, as described in detail below with respect to FIG. 2. It should be noted that in some alternative embodiments, lock handler 128 may be part of host OS 120 and external to hypervisor 125, rather than part of hypervisor 125. Moreover, in some alternative embodiments hypervisor 125 may be external to host OS 120, rather than embedded within host OS 120, or can represent the host OS 120.

Figure 2:
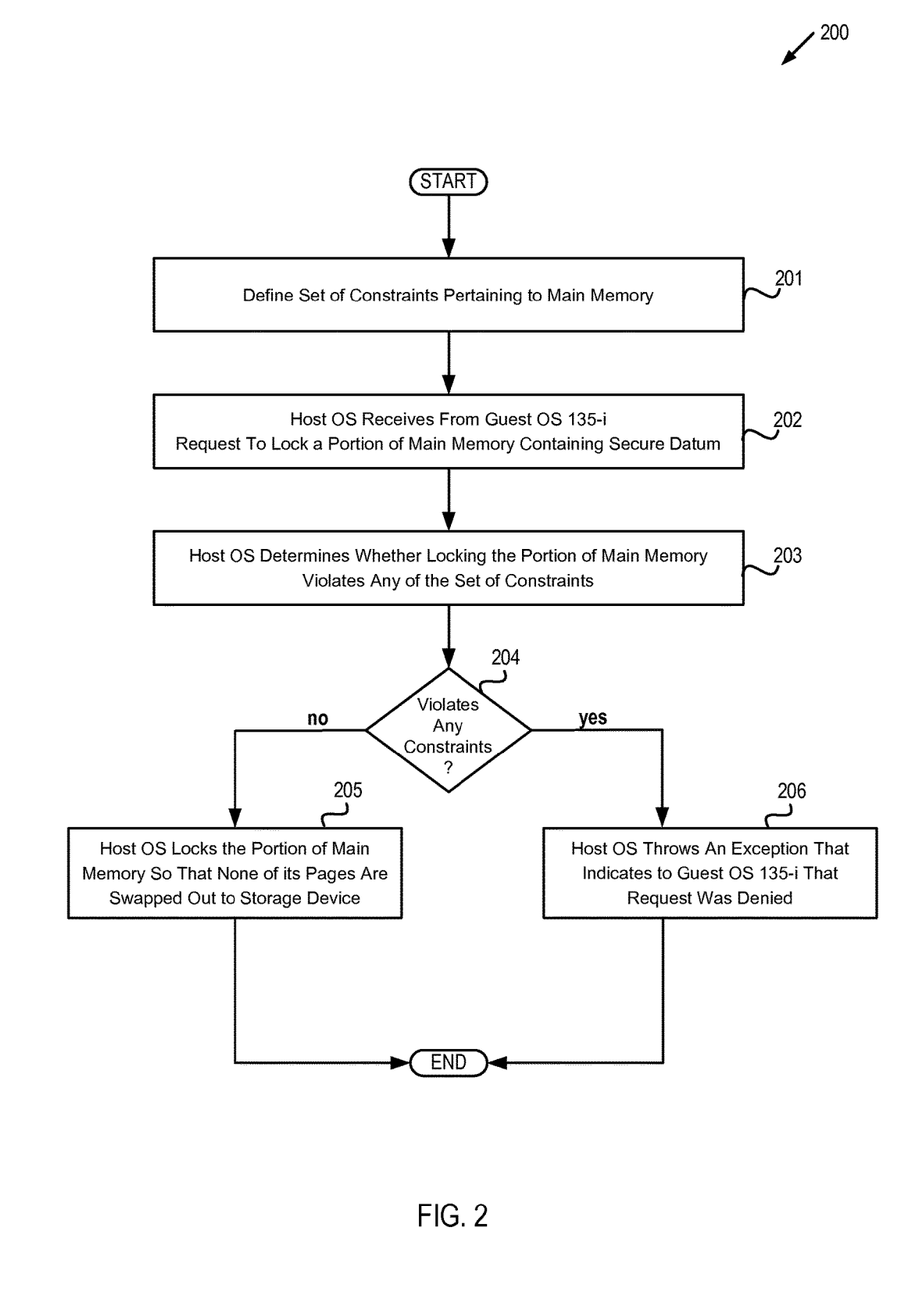
FIG. 2 depicts a flow diagram of one embodiment of a method for handling a lock request from a virtual machine.

FIG. 2 depicts a flow diagram of one embodiment of a method 200 for handling a lock request from a virtual machine 130-$i$, where i is an integer between 1 and N inclusive. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that although the method of FIG. 2 is disclosed in the context of a virtualized system that provides memory overcommit capability, the method is also applicable to virtualized systems that do not provide such capability. It should also be noted that blocks depicted in FIG. 2 can be performed simultaneously or in a different order than that depicted.

At block 201, a set of constraints pertaining to main memory is defined. In one embodiment, such memory constraints may include one or more of the following:

the amount of locked main memory per virtual machine should not exceed a given maximum value;

the total amount of main memory locked by all virtual machines on the computer system should not exceed a given maximum value; and the total amount of unlocked main memory should not be less than a given minimum value.

In some embodiments, the memory constraints, as well as the maximum and minimum values for these constraints, may be defined by a system administrator (e.g., via editing of a configuration text file, via a graphical user interface, etc.), while in some other embodiments, the memory constraints and maximum/minimum values may be hardcoded (e.g., in lock request handler 128, etc.).

At block 202, host operating system 120 receives from guest operating system 135-$i$ a request to lock a portion of main memory 170 that is allocated to VM 130-$i$ and contains a secure datum (e.g., a password, a private encryption key, etc.), where i is an integer between 1 and N inclusive. Virtual machine 130-$i$ may store the secure datum in a location of main memory 170 that is allocated to VM 130-$i$. The portion of main memory 170 that is requested to be locked may be all of the main memory 170 that is allocated to VM 130-$i$, or may be a subset of main memory allocated to VM 130-$i$. The request may be initiated by an application executing within VM 130-$i$, and may be forwarded by guest operating system 135-$i$ to hypervisor 125.

At block 203, host operating system 120 determines whether locking the portion of main memory 170 violates any of the set of memory constraints defined at block 201. In one embodiment, block 203 is performed by lock request handler 128.

Block 204 branches based on whether the request violates any of the memory constraints; if not, execution proceeds to block 205, otherwise execution continues at block 206. At block 205, host operating system 120 locks the portion of main memory 170 so that none of its pages are swapped out to storage device 180. At block 206, host operating system 120 throws an exception that indicates to guest operating system 135-$i$ that the request was denied.

Figure 3:
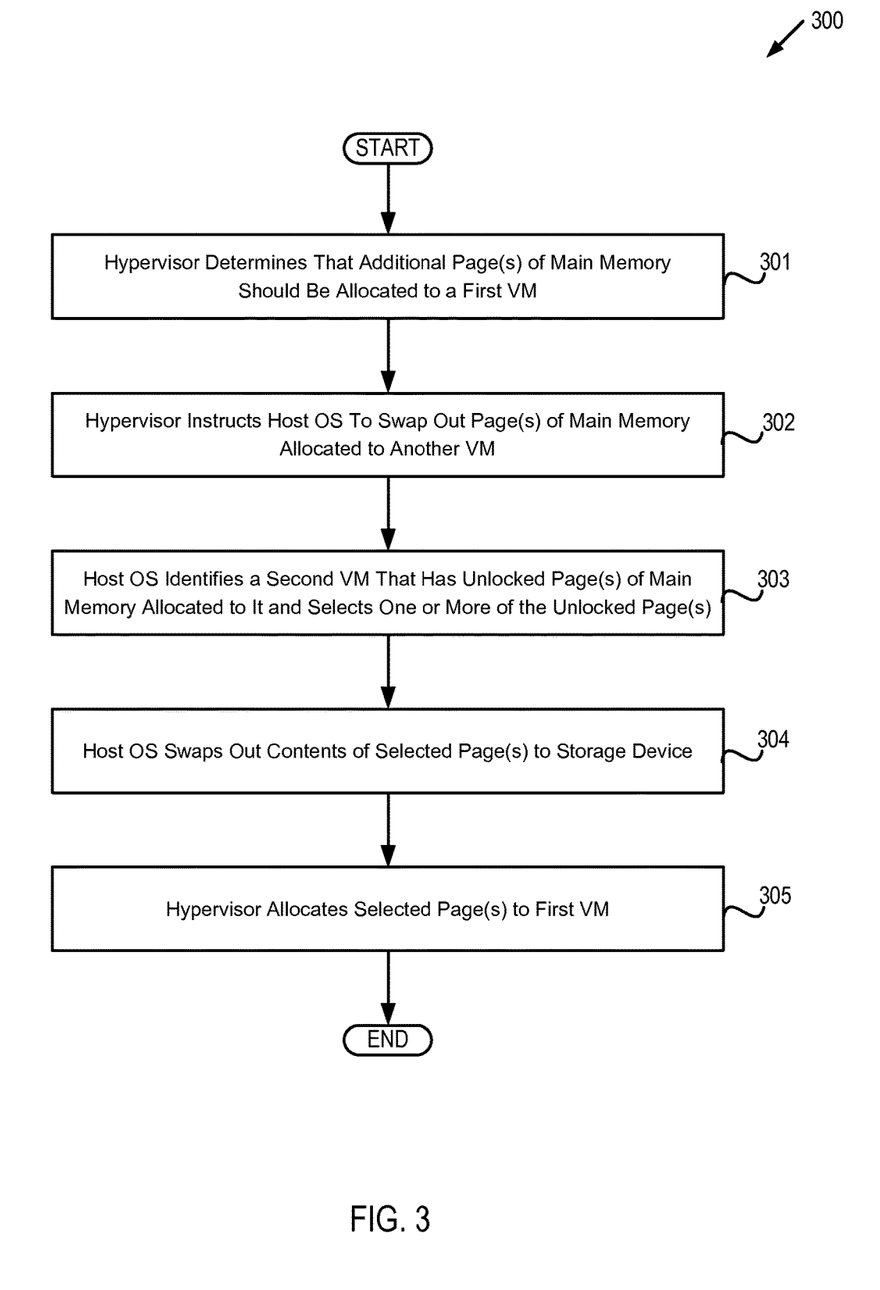
FIG. 3 depicts a flow diagram of one embodiment of a method for dynamically allocating memory among virtual machines in a computer system with memory overcommit capability.

FIG. 3 depicts a flow diagram of one embodiment of a method 300 for dynamically allocating memory among virtual machines in a computer system with memory overcommit capability. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 3 can be performed simultaneously or in a different order than that depicted.

At block 301, hypervisor 125 determines that one or more additional pages of main memory 170 should be allocated to a first virtual machine 130-$i$ (e.g., in response to a memory allocation request by an application executing in VM 130-$i$, etc.), where i is an integer between 1 and N inclusive. At block 302, hypervisor 125 instructs host operating system 120 to swap out one or more pages of main memory 170 that are allocated to another virtual machine.

At block 303, host operating system 120 identifies a second virtual machine 130-$j$ that has unlocked pages of main memory 170 and selects one or more unlocked pages of main memory 170 that are allocated to the second virtual machine 130-$j$, where j is an integer between 1 and N inclusive that does not equal i. At block 304, host operating system 120 swaps out the contents of the selected pages to storage device 304. At block 305, hypervisor 125 allocates the selected pages to the first VM 130-$i$.

Figure 4:
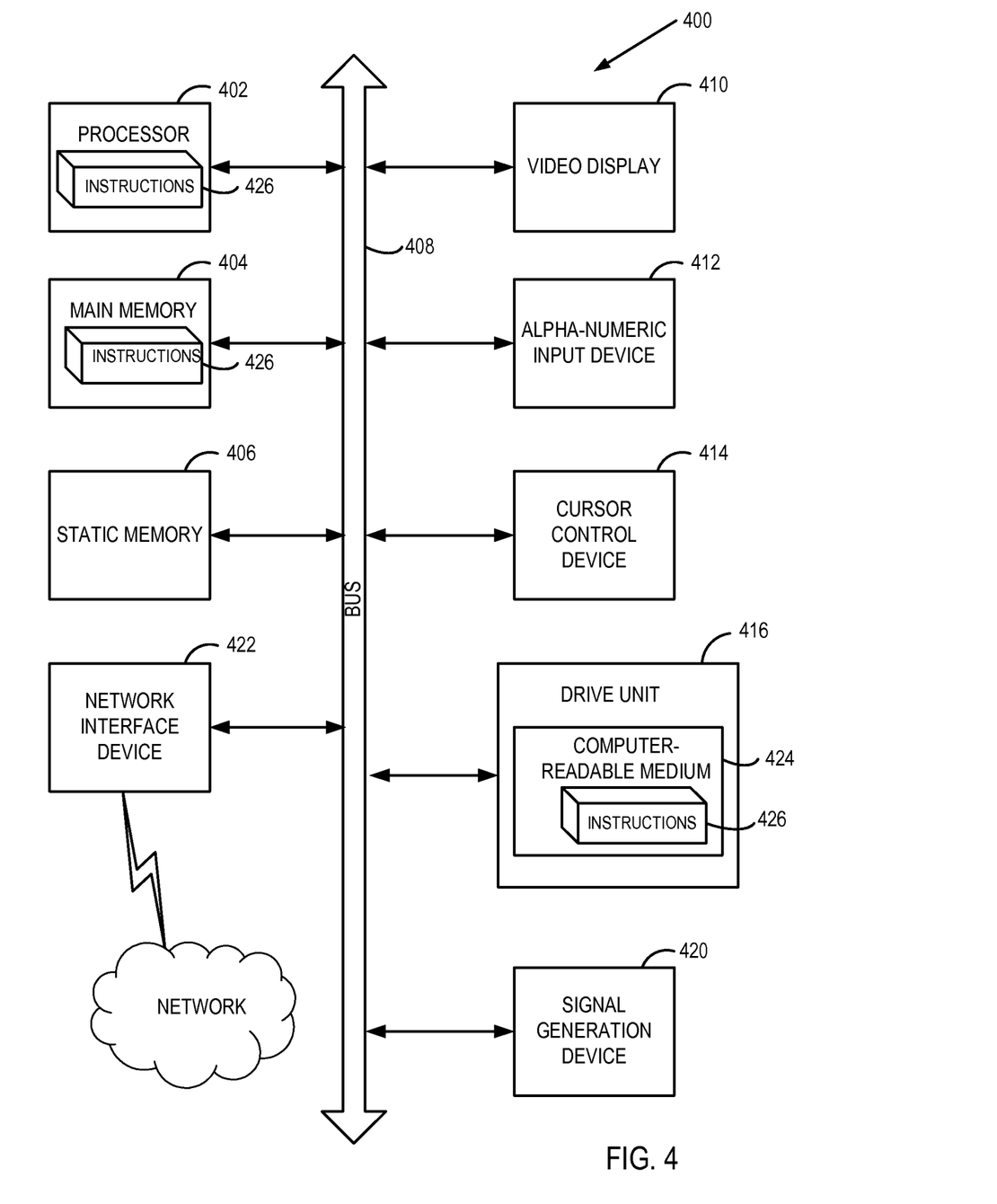
FIG. 4 depicts a block diagram of an illustrative computer system operating in accordance with embodiments of the invention.

FIG. 4 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a host operating system executed by a processing device, a plurality of constraints defined in a editable computer readable configuration file, wherein the plurality of constraints comprises a first constraint to prevent a total amount of unlocked memory allocated to a virtual machine from being less than a minimum value defined in the computer readable configuration file, a second constraint to prevent an amount of locked memory allocated to each virtual machine hosted by the host operating system from exceeding a first maximum value, and a third constraint to prevent an accumulated amount of locked memory allocated to each virtual machine hosted by the host operating system from exceeding a second maximum value;
   providing a user interface associated with the host operating system to edit at least one of the minimum value, the first maximum value or the second maximum value associated with the plurality of constraints in view of user input via the user interface;
   determining, by the host operating system, whether granting a request by a guest operating system of a virtual machine to lock a portion of memory violates the plurality of constraints, wherein responsive to detecting that the request violates the constraints, providing an indicator to the guest operating system of the virtual machine that the request is denied indicating at least one constraint of the plurality of constraints is violated;
   responsive to determining that the request does not violate the plurality of constraints, locking, by the processing device, the portion of memory allocated to the virtual machine, wherein the locking prevents the portion of memory from being swapped out to a storage device;
   swapping out to a storage device, by the host operating system, contents of a memory page of unlocked memory allocated to the virtual machine, wherein the unlocked memory is in compliance with the plurality of constraints; and
   responsive to swapping out the contents, allocating the memory page of the unlocked memory that is in compliance with the plurality of constraints from the virtual machine to a different virtual machine.

2. The method of claim 1, wherein the request to lock the portion of memory is initiated by an application executing within the virtual machine.

3. The method of claim 1, wherein the virtual machine stores a secure datum in a memory location of the portion of the memory.

4. The method of claim 1, wherein the processing device executes a hypervisor, and wherein the portion of the memory is allocated to the virtual machine by the hypervisor.

5. The method of claim 4, wherein the hypervisor supports memory overcommit, and wherein a total amount of memory allocated to virtual machines hosted by the host operating system exceeds a physical size of main memory associated with a computer system comprising the processing device.

6. An apparatus comprising:
   a main memory; and
   a processing device, operatively coupled to the main memory, the processing device to:
      execute a host operating system;
      identify a plurality of constraints defined in a editable computer readable configuration file, wherein the plurality of constraints comprises a first constraint to prevent a total amount of unlocked memory allocated to a virtual machine from being less than a minimum value defined in the computer readable configuration file, a second constraint to prevent an amount of locked memory allocated to each virtual machine hosted by the host operating system from exceeding a first maximum value, and a third constraint to prevent an accumulated amount of locked memory allocated to each virtual machine hosted by the host operating system from exceeding a second maximum value;
      provide a user interface executed by the processing device to edit at least one of the minimum value, the first maximum value or the second maximum value associated with the plurality of constraints in view of user input via the user interface;
      determine, via the host operating system, whether granting a request by a guest operating system of a virtual machine to lock a portion of memory allocated to the virtual machine violates the plurality of constraints defined in a computer readable configuration file, wherein responsive to detecting that the request violates the constraints, providing an indicator to the guest operating system of the virtual machine that the request is denied indicating at least one constraint of the plurality of constraints is violated;
      responsive to determining that the request does not violate the plurality of constraints, locking, by the host operating system, the portion of memory corresponding to the virtual memory allocated to the virtual machine, wherein the locking prevents the portion of memory from being swapped out to a storage device;
      swap out to a storage device, via the host operating system, contents of a memory page of unlocked memory allocated to the virtual machine, wherein the unlocked memory is in compliance with the plurality of constraints; and responsive to swapping out the contents, allocate the memory page of the unlocked memory that is in compliance with the plurality of constraints from the virtual machine to a different virtual machine.

7. The apparatus of claim 6 wherein the virtual machine to store a secure datum in a memory location of the portion of the memory.

8. The apparatus of claim 6 wherein the processing device is further to execute a hypervisor, and wherein the portion of the memory is allocated to the virtual machine by the hypervisor.

9. The apparatus of claim 8 wherein the hypervisor supports memory overcommit, and wherein a total amount of the memory allocated to virtual machines hosted by the apparatus exceeds a physical size of main memory associated with the apparatus.

10. The apparatus of claim 6 further comprising the storage device.

11. A non-transitory computer readable storage medium, having instructions stored therein which, when executed by a processing device, cause the processing device to:

identify, by a host operating system executed by the processing device, a plurality of constraints defined in a editable computer readable configuration file, wherein the plurality of constraints comprises a first constraint to prevent a total amount of unlocked memory allocated to a virtual machine from being less than a minimum value defined in the computer readable configuration file, a second constraint to prevent an amount of locked memory allocated to each virtual machine hosted by the host operating system from exceeding a first maximum value, and a third constraint to prevent an accumulated amount of locked memory allocated to each virtual machine hosted by the host operating system from exceeding a second maximum value;

provide a user interface associated with the host operating system to edit at least one of the minimum value, the first maximum value or the second maximum value associated with the plurality of constraints in view of user input via the user interface;

determine, whether granting a request by a guest operating system of a virtual machine to lock a portion of memory allocated to the virtual machine violates the plurality of constraints defined in a computer readable configuration file, wherein responsive to detecting that the request violates the constraints, providing an indicator to the guest operating system of the virtual machine that the request is denied indicating at least one constraint of the plurality of constraints is violated, responsive to determining that the request does not violate the plurality of constraints, locking, by the host operating system, the portion of memory allocated to the virtual machine, wherein the locking prevents the portion of memory from being swapped out to a storage device, swap out to a storage device, via the host operating system, contents of a memory page of unlocked memory corresponding to virtual memory allocated to the virtual machine, wherein the unlocked memory is in compliance with the plurality of constraints; and responsive to swapping out the contents, allocate the memory page of the unlocked memory that is in compliance with the plurality of constraints from the virtual machine to a different virtual machine.

12. The non-transitory computer readable storage medium of claim 11 wherein the request to lock the portion of memory is forwarded to a hypervisor by the guest operating system.

* * * * *